United States Patent
Artonne et al.

(10) Patent No.: US 6,844,990 B2
(45) Date of Patent: Jan. 18, 2005

(54) METHOD FOR CAPTURING AND DISPLAYING A VARIABLE RESOLUTION DIGITAL PANORAMIC IMAGE

(75) Inventors: Jean-Claude Artonne, Montreal (CA); Christophe Moustier, Marseilles (FR); Benjamin Blanc, Montreal (CA)

(73) Assignee: 6115187 Canada Inc., Saint Laurent (CA)

( * ) Notice: Subject to any disclaimer, the term of this patent is extended or adjusted under 35 U.S.C. 154(b) by 0 days.

(21) Appl. No.: 10/706,513

(22) Filed: Nov. 12, 2003

(65) Prior Publication Data

US 2004/0136092 A1 Jul. 15, 2004

Related U.S. Application Data

(63) Continuation of application No. PCT/FR02/01588, filed on May 10, 2002.

(30) Foreign Application Priority Data

May 11, 2001 (FR) .............................................. 01 06261

(51) Int. Cl.$^7$ ........................... G02B 13/06; G02B 13/18
(52) U.S. Cl. ..................................... 359/725; 359/718
(58) Field of Search .............................. 359/718, 719, 359/725, 728

(56) References Cited

U.S. PATENT DOCUMENTS

| | | | |
|---|---|---|---|
| 3,953,111 A | 4/1976 | Fisher et al. | |
| 5,880,896 A | 3/1999 | Ishii et al. | |
| 6,031,670 A | 2/2000 | Inoue | |
| 6,333,826 B1 * | 12/2001 | Charles | 359/725 |
| 6,449,103 B1 * | 9/2002 | Charles | 359/725 |

FOREIGN PATENT DOCUMENTS

| | | |
|---|---|---|
| EP | 0 695 085 A1 | 1/1996 |
| EP | 1 004 915 A1 | 5/2000 |
| WO | WO 00/42470 A1 | 7/2000 |

* cited by examiner

Primary Examiner—Scott J. Sugarman
(74) Attorney, Agent, or Firm—Akin Gump Strauss Hauer & Feld, LLP

(57) ABSTRACT

A method for capturing a digital panoramic image includes projecting a panorama onto an image sensor by means of a panoramic objective lens. The panoramic objective lens has a distribution function of the image points that is not linear relative to the field angle of the object points of the panorama, such that at least one zone of the image obtained is expanded while at least another zone of the image is compressed. When a panoramic image obtained is then displayed, correcting the non-linearity of the initial image is required and is performed by means of a reciprocal function of the non-linear distribution function of the objective lens or by means of the non-linear distribution function.

26 Claims, 11 Drawing Sheets

Fig. 12

| S1 – Acquisition |
|---|
| - Taking a panoramic image by means of a still digital camera or a digital video camera equipped with a panoramic lens having a non-linear distribution function Fd |

| S2 – Transfer of the image file into a computer |
|---|
| - Transfer of the image file (image disk) into a microcomputer<br>- Storage in the auxiliary storage (optional) |

| S3 - Linearisation of the image disk |
|---|
| - Transfer of the image points of the initial image disk into a second virtual image disk comprising more image points than the initial image disk, by means of the function $Fd^{-1}$<br>Obtaining a linear image disk |

| S4 – Digitisation |
|---|
| - Transfer of the image points of the second image disk into a system of axes OXYZ in spherical coordinates  Obtaining a panoramic image in a hemisphere |

| S5 – Interactive display |
|---|
| - Determination of the image points of an image sector to be displayed<br>- Display of the image sector on a display window<br>- Detection of the user's actions on a screen pointer or any other control means,<br>- Detection of the user's actions on keys for image enlargement,<br>- Modification of the sector displayed (sliding the image sector displayed on the surface of the hemisphere and/or shrinking/expanding the image sector displayed) |

METHOD FOR CAPTURING AND DISPLAYING A VARIABLE RESOLUTION DIGITAL PANORAMIC IMAGE

CROSS-REFERENCE TO RELATED APPLICATIONS

This application is a continuation of International Application No. PCT/FR02/01588, filed May 10, 2002 the disclosure of which is incorporated herein by reference.

BACKGROUND OF THE INVENTION

The present invention relates to obtaining digital panoramic images and displaying panoramic images on computer screens.

FIG. 1 represents a classical device allowing a digital panoramic image to be produced and presented on a computer screen. The device comprises a digital camera 1 equipped with a panoramic objective lens 2 of the "fish-eye" type, having an angular aperture on the order of 180°. The camera 1 is connected to a computer 5, such as a microcomputer for example, equipped with a screen 6. The connection to the microcomputer 5 may be permanent, when, for example, the camera 1 is a digital video camera, or temporary, when, for example, the camera 1 is a still digital camera equipped with an image memory, the connection then being carried out at the time the image files are to be transferred into the microcomputer.

FIG. 2 schematically represents the appearance of a panoramic image 3 obtained by means of the panoramic objective lens 2. The round appearance of the image is characteristic of the axial symmetry of panoramic objective lenses and the image has dark edges 4 that will subsequently be removed. This digital panoramic image is delivered by the camera 1 in the form of a computer file containing image points coded RGBA arranged in a two-dimensional table, "R" being the red pixel of an image point, "G" the green pixel, "B" the blue pixel, and "A" the Alpha parameter or transparency. The parameters R, G, B, A are generally being coded on 8 bits.

The image file is transferred into the microcomputer 5 which transforms the initial image into a three-dimensional digital image, then presents the user with a sector of the three-dimensional image in a display window 7 occupying all or part of the screen 6.

FIG. 3 schematically shows classical steps of transforming the two-dimensional panoramic image into a panoramic image offering a realistic perspective effect. After removing the black edges of the image, the microcomputer has a set of image points forming an image disk 10 of center O and axes OX and OY. The image points of the image disk are transferred into a three-dimensional space defined by an orthogonal coordinate system of axes O'X'Y'Z, the axis O'Z being perpendicular to the plane of the image disk. The transfer is performed by a mathematical function implemented by an algorithm executed by the microcomputer, and leads to obtaining a set of image points referenced in the coordinate system O'X'Y'Z. These image points are for example coded in spherical coordinates RGBA($\phi,\theta$), $\phi$ being the latitude and $\theta$ the longitude of an image point. The angles $\phi$ and $\theta$ are coded in 4 to 8 bytes (IEEE standard). These image points form a hemisphere 11 when the panoramic objective lens used has an aperture of 180°, otherwise a portion of a hemisphere. The microcomputer thus has a virtual image in the shape of a hemisphere one sector 12 of which, corresponding to the display window 7, is presented on the screen (FIG. 1) considering that the observer is on the central point O' of the system of axes O'X'Y'Z, which defines with the center O" of the image sector 12, a direction O'O" called "viewing direction".

In order to avoid the image sector displayed 12 having geometrical distortions unpleasant for the observer, the classical panoramic objective lenses must have a distribution function of the image points according to the field angle of the object points of a panorama that is as linear as possible. Therefore, if two points A', B', situated on the same meridian of the hemisphere 11, and the corresponding points A, B on the image disk 10 are considered, the ratio between the angles (A'O'Z) and (B'O'Z) must be equal to the ratio between the distances OA and OB on the image disk.

Due to this property of linearity of a classical panoramic objective lens, image points corresponding to object points having an identical field angle form concentric circles C10, C20 . . . C90 on the image disk 10, as represented in FIG. 4A. Classically, "field angle of an object point" means the angle of an incident light ray passing through the object point considered and through the center of the panorama photographed, relative to the optical axis of the objective lens. The field angle of an object point can be between 0 and 90° for an objective lens having an aperture of 180°. Therefore, the circle C10 is formed by the image points corresponding to object points having a field angle of 10°, the circle C20 is formed by image points corresponding to object points having a field angle of 20°, etc., the circle C90 being formed by the image points having a field angle of 90°.

FIG. 4B represents the shape of the distribution function Fdc of a classical panoramic objective lens, which determines the relative distance dr of an image point in relation to the center of the image disk according to the field angle ax of the corresponding object point. The relative distance dr is between 0 and 1 and is equal to the distance of the image point in relation to the center of the image divided by the radius of the image disk. The ideal form of the function Fdc is a straight line of gradient K:

$$dr = Fdc(\alpha) = K\alpha$$

in which the constant K is equal to 0.111 degree$^{-1}$ (1/90°).

This technique of displaying a digital panoramic image sector on a computer screen has various advantages, particularly the possibility of "exploring" the panoramic image by sliding the image sector presented on the screen to the left, the right, upwards or downwards, until the limits of the panoramic image are reached. This technique also allows complete rotations of the image to be carried out when two complementary digital images have been taken and supplied to the microcomputer, the latter thus reconstituting a complete panoramic sphere by assembling two hemispheres. Another advantage provided by presenting a panoramic image on screen is to enable the observer to make enlargements or zooms on parts of the image. The zooms are performed digitally, by shrinking the image sector displayed and expanding the distribution of the image points on the pixels of the screen.

Various examples of interactive panoramic images can be found on the Web. Reference could be made in particular to the central site "http://www.panoguide.com" ("*The Guide to Panoramas and Panoramic Photography*") which gives a full overview of all the products available to the public to produce these images. Software programs allowing digital panoramic photographs to be transformed into interactive panoramic images are offered to the public in the form of downloadable programs or CD-ROMs available in stores.

Despite the various advantages that this technique for displaying digital images offers, the digital enlargements have the disadvantage of being limited by the resolution of the image sensor used when taking the initial image and the resolution of an image sensor is generally much lower than that of a classical photograph. Therefore, when the enlargement increases, the granulosity of the image appears as the limits of the resolution of the image sensor are being reached.

To overcome this disadvantage, it is well known to proceed with pixel interpolations so as to delay the apparition of the blocks of color which betray the limits of the resolution of the sensor. However, this method only improves the appearance of the enlarged image sector and does not in any way increase the definition. Another obvious solution is to provide an image sensor with a high resolution, higher than the resolution required to present an image sector without enlargement, so that there is a remaining margin of definition for zooms. However, this solution is expensive as the cost price of an image sensor rapidly rises with the number of pixels per unit of area.

Some attempts have been made to improve the quality of the enlargements, by changing the optical properties of the panoramic objective lenses themselves. Thus, U.S. Pat. No. 5,710,661 teaches capturing a panoramic image with two overlocking objective lenses using a set of mirrors. A first set of mirrors provides an overall view, and a mobile central mirror provides a detailed view on a determined zone of the panorama. However, this solution does not offer the same flexibility as digital zooms, particularly when the image is not displayed in real time, as the observer no longer has the possibility of choosing the image portion that he wants to enlarge once the photograph has been taken.

BRIEF SUMMARY OF THE INVENTION

Therefore, the present invention comprises a method allowing the physical limits of image sensors to be circumvented and the definition offered by digital enlargements concerning certain parts of a digital panoramic image to be improved, without the need to increase the number of pixels per unit of area of an image sensor or to provide an overlooking optical enlargement system in a panoramic objective lens.

The present invention is based on the observation that, in several applications, only certain zones of a panoramic image are of a practical interest and are likely to be expanded by the observer by means of a digital zoom. Thus, in applications such as video surveillance, videoconferencing, visio-conferencing, a panoramic camera can be installed against a wall or on the ceiling and there is generally no reason to make enlargements on the zones of the panoramic image corresponding to the wall or the ceiling. Similarly, as part of a videoconference performed by means of a panoramic camera, the most interesting zone is generally situated at a specific place situated towards the center of the image (in the case of individual use) or on the edges of the image (in the case of collective use or visio-conferencing). Furthermore, when used for recreation and leisure, most panoramic images comprise parts that are less interesting than others, such as the parts representing the sky or a ceiling for example, the most useful part generally being in the vicinity of the center of the image.

Therefore, the present invention is based on the premise that a panoramic image has some zones that are not very useful and that can tolerate a reasonable definition to the benefit of other zones of the image.

On the basis of this premise, the idea of the present invention is to produce panoramic photographs by means of a panoramic objective lens that is not linear, which expands certain zones of the image and compresses other zones of the image. The technical effect obtained is that the expanded zones of the image cover a number of pixels of the image sensor that is higher than if they were not expanded, and thus benefit from a better definition. By choosing an objective lens that expands the most useful zones of an image (which depend on the intended application), the definition is excellent in these zones and the definition is mediocre in the zones of lesser importance.

Thus, the present invention proposes a method for capturing a digital panoramic image, by projecting a panorama onto an image sensor by means of a panoramic objective lens, in which the panoramic objective lens has an image point distribution function that is not linear relative to the field angle of object points of the panorama, the distribution function having a maximum divergence of at least ±10% compared to a linear distribution function, such that the panoramic image obtained has at least one substantially expanded zone and at least one substantially compressed zone.

According to one embodiment, the objective lens has a non-linear distribution function that is symmetrical relative to the optical axis of the objective lens, the position of an image point relative to the center of the image varying according to the field angle of the corresponding object point.

According to one embodiment, the objective lens expands the center of the image and compresses the edges of the image.

According to one embodiment, the objective lens expands the edges of the image and compresses the center of the image.

According to one embodiment, the objective lens compresses the center of the image and the edges of the image, and expands an intermediate zone of the image located between the center and the edges of the image.

According to one embodiment, the objective lens comprises a set of lenses forming an apodizer.

According to one embodiment, the set of lenses forming an apodizer comprises at least one aspherical lens.

According to one embodiment, the set of lenses forming an apodizer comprises at least one diffractive lens.

According to one embodiment, the objective lens comprises a set of mirrors comprising at least one distorting mirror.

The present invention also relates to a method for displaying an initial panoramic image obtained in accordance with the method described above, comprising a step of correcting the non-linearity of the initial image, performed by means of a reciprocal function of the non-linear distribution function of the objective lens or by means of the non-linear distribution function.

According to one embodiment, the step of correcting comprises a step of transforming the initial image into a corrected digital image comprising a number of image points higher than the number of pixels that the image sensor comprises.

According to one embodiment, the method comprises a step of calculating the size of the corrected image, by means of the reciprocal function of the distribution function, so that the resolution of the corrected image is equivalent to the most expanded zone of the initial image, and a step of scanning each image point of the corrected image, searching for the position of a twin point of the image point on the initial image and allocating the color of the twin point to the image point of the corrected image.

According to one embodiment, the initial image and the corrected image comprise an image disk.

According to one embodiment, the method comprises a step of transferring the image points of the corrected image into a three-dimensional space and a step of presenting one sector of the three-dimensional image obtained on a display means.

According to one embodiment, the method comprises a step of determining the color of image points of a display window, by projecting the image points of the display window onto the initial image by means of the non-linear distribution function, and allocating to each image point of the display window the color of an image point that is the closest on the initial image.

According to one embodiment, the projection of the image points of the display window onto the initial image comprises a step of projecting the image points of the display window onto a sphere or a sphere portion, a step of determining the angle in relation to the center of the sphere or the sphere portion of each projected image point, and a step of projecting onto the initial image each image point projected onto the sphere or the sphere portion, the projection being performed by means of the non-linear distribution function considering the field angle that each point to be projected has in relation to the center of the sphere or the sphere portion.

The present invention also relates to a panoramic objective lens comprising optical means for projecting a panorama into an image plane of the objective lens, the panoramic objective lens having an image point distribution function that is not linear relative to the field angle of object points of the panorama, the distribution function having a maximum divergence of at least ±10% compared to a linear distribution function, such that a panoramic image obtained by means of the objective lens comprises at least one substantially expanded zone and at least one substantially compressed zone.

According to one embodiment, the panoramic objective lens has a non-linear distribution function that is symmetrical relative to the optical axis of the objective lens, the position of an image point relative to the center of an image obtained varying according to the field angle of the corresponding object point.

According to one embodiment, the panoramic objective lens expands the center of an image and compresses the edges of the image.

According to one embodiment, the panoramic objective lens expands the edges of an image and compresses the center of the image.

According to one embodiment, the panoramic objective lens compresses the center of an image and the edges of the image, and expands an intermediate zone of the image located between the center and the edges of the image.

According to one embodiment, the panoramic objective lens comprises a set of lenses forming an apodizer.

According to one embodiment, the set of lenses forming an apodizer comprises at least one aspherical lens.

According to one embodiment, the set of lenses forming an apodizer comprises at least one diffractive lens.

According to one embodiment, the panoramic objective lens comprises polymethacrylate lenses.

According to one embodiment, the panoramic objective lens comprises a set of mirrors comprising at least one distorting mirror.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 12 is a flow chart describing a method for displaying a panoramic image incorporating the first correction method according to the present invention;

DETAILED DESCRIPTION OF THE INVENTION

A—Compression/Expansion of an Initial Image

Figure 5:
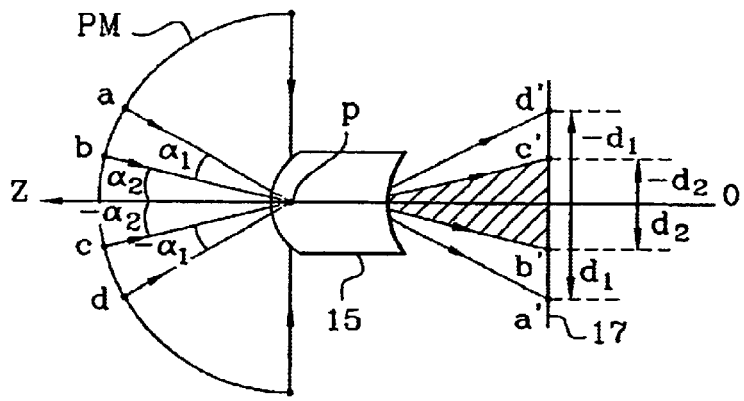
FIGS. 5 and 6 show one aspect of the method according to the present invention and respectively represent a distribution of image points obtained with a classical panoramic objective lens and a distribution of image points obtained with a non-linear panoramic objective lens according to the present invention.

FIG. 5 schematically represents a classical system for taking panoramic shots, comprising a panoramic objective lens 15 of optical axis OZ and a digital image sensor 17 arranged in the image plane of the objective lens 15. Here, four object points a, b, c, d will be considered that belong to a panorama PM located opposite the objective lens and respectively having angles of incidence α1, α2, −α2, −α1. As explained in the preamble, the field angle of an object point is the angle that an incident light ray passing through the object point considered and through the center of the panorama PM, marked by a point "p" on FIG. 5, has relative to the optical axis OZ of the objective lens. In this example, the angle α1 is equal to two times the angle α2. On the image sensor 17, image points a', b', c', d' corresponding to the object points a, b, c, d are located at distances from the center of the image respectively equal to d1, d2, −d2, −d1. As the distribution of the image points according to the field angle of the object points is linear with a classical panoramic objective lens, the distances d1 and d2 are linked by the following relation:

$$d1/\alpha1 = d2/\alpha2$$

As the angle α1 is here equal to 2α2, it follows that:

$$d1 = 2d2$$

As is well known by those skilled in the art, the term "linearity" here refers to a ratio of proportionality between the distance of an image point measured relative to the center of the image and the field angle of the corresponding object point. The notion of "linearity" in the field of panoramic objective lenses is therefore different from that prevailing in the field of paraxial optics (in the vicinity of the optical axis) when the conditions of Gauss are met.

Figure 6:
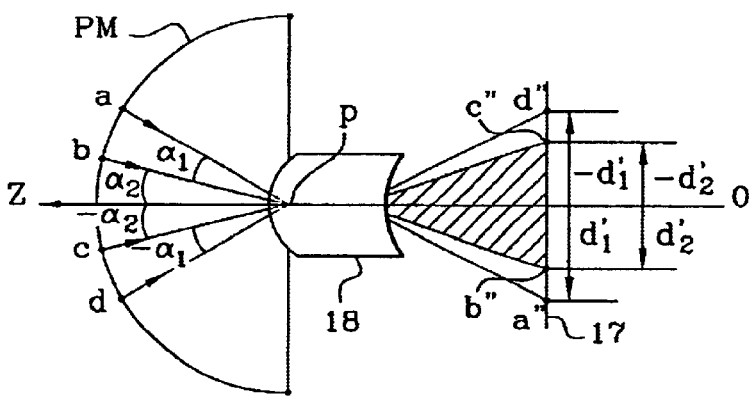

FIG. 6 represents a system for taking shots of the same type as above, but in which the classical panoramic objective lens 15 is replaced by an objective lens 18 according to the present invention, the image sensor 17 being arranged in the image plane of the objective lens 15. The projection onto the image sensor 17 of the object points a, b, c, d having angles of incidence α1, α2, −α2 and −α1 relative to the axis OZ of the objective lens and to the center "p" of the panorama are considered again. On the image sensor 17, the corresponding image points a", b", c", d" are located at distances from the center of the image respectively equal to d1', d2', −d2', −d1'.

According to the present invention, the objective lens 18 has a distribution function of the image points that is not linear. The ratio of the distances d1', d2', −d2', −d1' are not equal to the ratio of the angles of incidence α1, α2, −α2, −α1. In the example represented, the distance d2' is clearly greater than d1'/2, such that the central part of the panoramic image projected onto the image sensor 17, which corresponds to a solid angle 2α2 centered on the optical axis OZ, occupies a greater area on the image sensor 17 than the area it occupies in FIG. 5 with the classical panoramic objective lens (hatched zone). This central part of the panoramic image is therefore projected onto the image sensor with expansion of its area, in relation to the area the central part would occupy if the objective lens were linear. The result is that the number of pixels of the image sensor covered by this part of the image is greater than in previous practices and that the definition obtained is improved. On the other hand, the part of the image delimited by two circles respectively passing through the points a", d" and through the points b", c" is compressed relative to the corresponding part in FIG. 5, and the definition on the edges of the image is less than that obtained with a classical linear objective lens, to the benefit of the central part of the image.

By applying the principle according to the present invention, which involves expanding one part of the image and compressing another part of the image, the part to be expanded and the part to be compressed can be chosen according to the intended application, by producing several types of non-linear objective lenses and by choosing an objective lens suited to the intended application. Depending on the intended application, the most useful part of a panoramic image may be located in the center of the image, on the edge of the image, in an intermediate zone situated between the center and the edge of the image, etc.

FIGS. 7A–7B, 8 and 9 show three examples of non-linear distribution functions according to the present invention.

Figure 1:
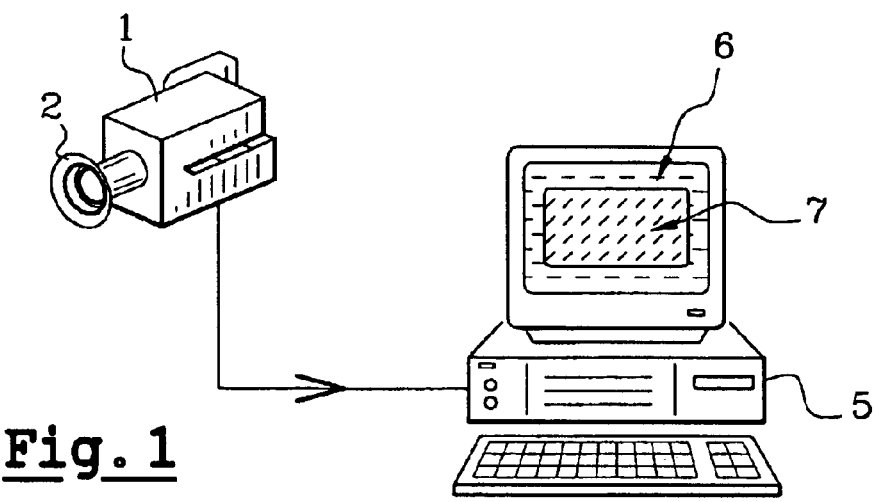
FIG. 1 described above represents a system for displaying a digital panoramic image on a screen.
Figure 2:
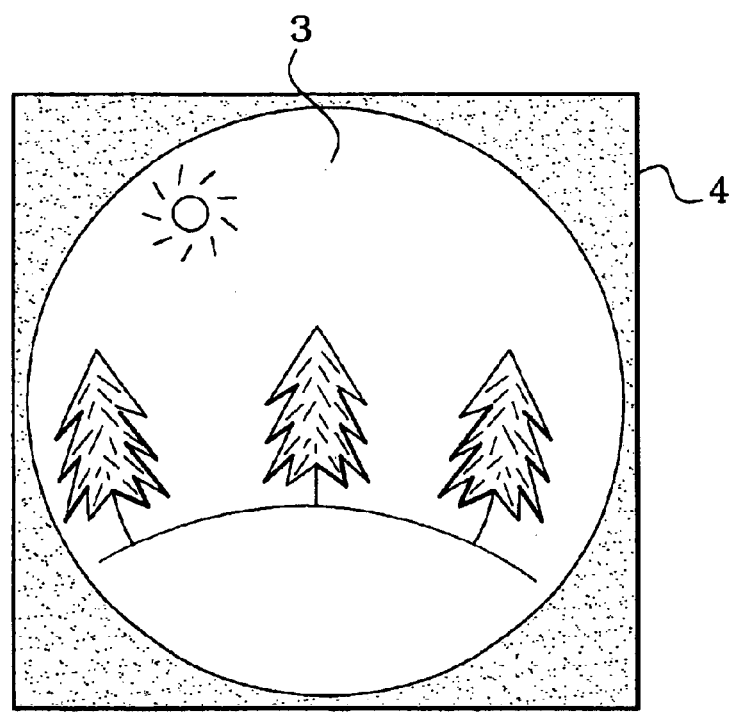
FIG. 2 described above represents a panoramic image before it is processed by a computer.
Figure 3:
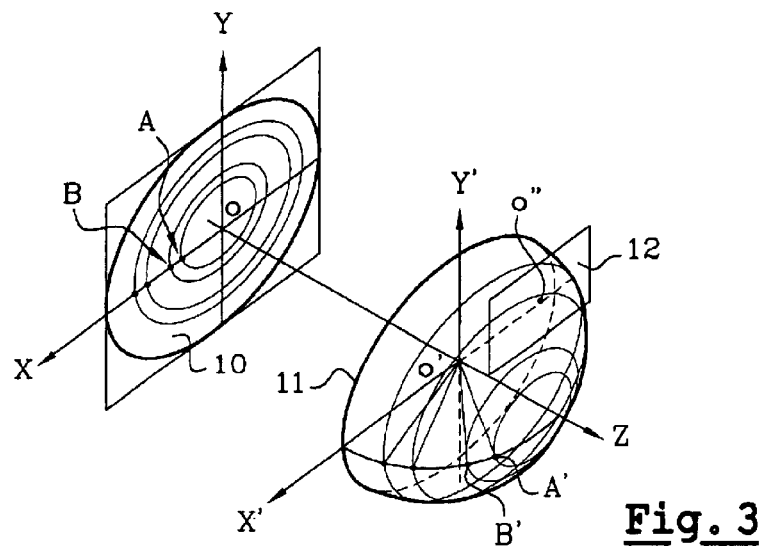
FIG. 3 described above shows a classical method for transforming a two-dimensional panoramic image into a three-dimensional digital panoramic image.
Figure 4A:
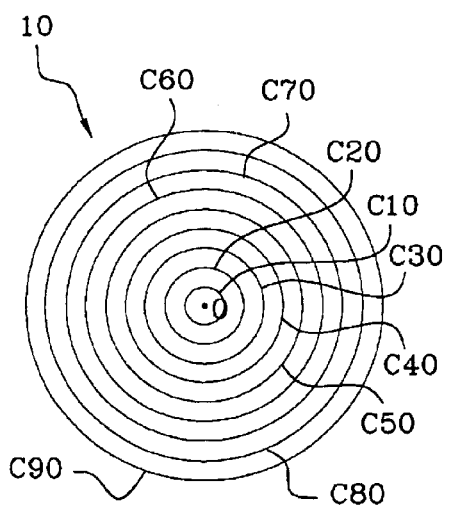
FIGS. 4A and 4B described above show the linearity of a classical panoramic objective lens.
Figure 7A:
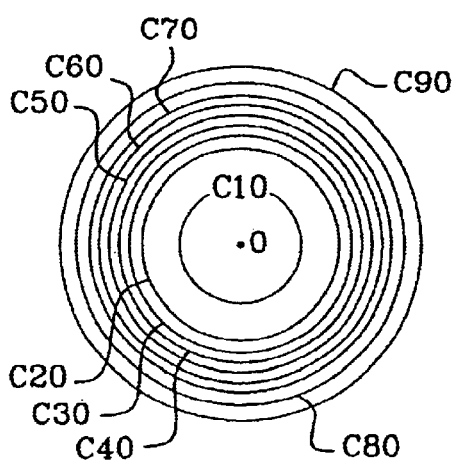
FIGS. 7A and 7B show a first example of non-linearity of a panoramic objective lens according to the present invention.
Figure 7B:
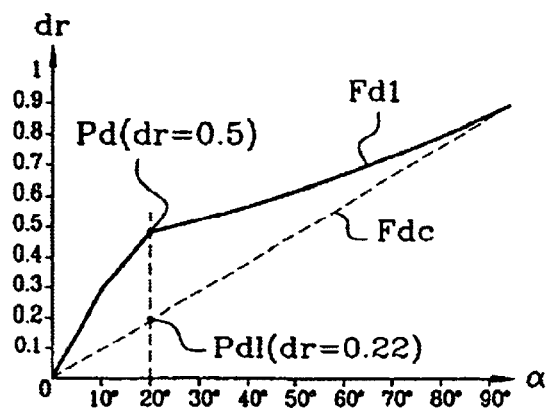

The distribution function shown in FIGS. 7A and 7B corresponds to the example in FIG. 6, that is a panoramic objective lens that expands the image in the center. FIG. 7A represents equidistant concentric circles C10, C20, ..., C90 present on an image disk, each circle being formed by image points corresponding to object points having the same field angle. The circle C10 is formed by the image points corresponding to object points having a field angle of 10°, the circle C20 is formed by image points corresponding to object points having a field angle of 20°, etc. By comparing FIG. 7A with FIG. 4A described in the preamble, it appears that the circles C10 and C20 are further from the center of the image and further from each other than the circles C10 and C20 obtained with a classical objective lens, while the circles C30 to C90 are closer to each other. This panoramic image thus has an expanded zone in the center and a compressed zone on the edge of the image disk.

Figure 4B:
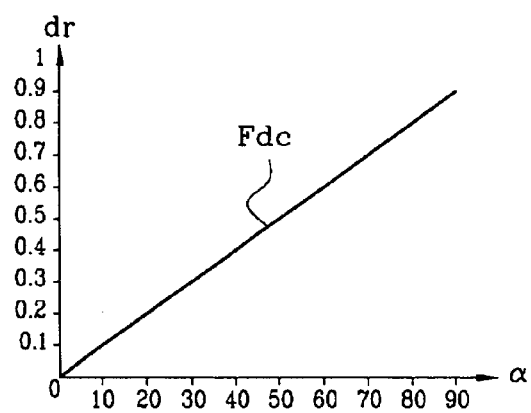

FIG. 4B represents the curve of the corresponding distribution function Fd1. The classical linear distribution function, expressed by Fdc=Kα and in the form of a straight line of gradient K, is also represented as a guide mark (the constant K being equal to 1/90 for an objective lens having an aperture of 180°, i.e., a gradient of 0.111 per degree). The field angle α of the object points is represented on the X-axis and is between 0 and 90°. The relative distance dr of an image point in relation to the center of the image disk is represented on the Y-axis and is between 0 and 1. The curve of the function Fd1 has a higher gradient than the straight line Fdc for angles α of between 0 and 20°, then a lesser gradient after 20° and up to 90°. A high gradient means an expansion of the image and a low gradient means a compression of the image.

As demonstrated in this example, the curve Fd1 has a point of maximum divergence Pd at the angle α=20°. "Point of maximum divergence" refers to the image point Pd(α) at which the greatest gap in relative distance dr in relation to a corresponding point Pdl(α) on the linear distribution straight line Kα can be observed. In this example, the point Pd(α=20°) has a relative distance dr equal to 0.5 relative to the center of the image while the corresponding point Pdl(α=20°) on the linear curve Fdc has a relative distance dr of 0.222. The maximum divergence DIVmax of the distribution function Fd1 according to the present invention can be calculated by a formula of the type:

$$DIVmax \% = [[dr(Pd) - dr(Pdl)]/[dr(Pdl)]] * 100$$

i.e.:

$$DIVmax \% = [[dr(Pd) - K*\alpha(Pd)]/[K*\alpha(Pd)]] * 100$$

In which dr(Pd) is the relative distance in relation to the center of the point of maximum divergence Pd, dr(Pdl) is the relative distance in relation to the center of the corresponding point on the linear distribution straight line Fdc, α(Pd) being the abscissa of the point Pd, i.e., the field angle of the corresponding object point.

In the example considered here, the maximum divergence is therefore equal to +125%. This value of maximum divergence according to the present invention is clearly higher than that due to the possible design errors or manufacturing errors of a classical panoramic objective lens, which is of a few percent. Generally speaking, a non-linear objective lens according to the present invention has a maximum divergence on the order of 10% at least, to obtain an expansion of the useful parts of the image which results in a clear increase in the number of pixels of the image sensor covered by the useful parts and a substantial improvement in the definition obtained.

An average rate TX of expansion or compression of one part of the image contained between two circles passing through points Pd1 and Pd2 is also defined. The rate TX is the ratio between the area delimited by the two circles passing through the points Pd1, Pd2 and the area delimited by two circles passing through points Pdl1, Pdl2 of the same abscissa belonging to the linear distribution function Fdc. The rate TX can be determined by a formula of the type:

$$TX=[dr(Pd1)^2-dr(Pd2)^2]/[(dr(Pd1))^2-(dr(Pd2))^2]$$

i.e.:

$$TX=[dr(Pd1)^2-dr(Pd2)^2]/[K^2[(\alpha(Pd1))^2-(\alpha(Pd2))^2]]$$

A rate TX higher than 1 indicates an expansion of the part of image considered while a rate TX lower than 1 indicates a compression of the part of image considered. In the example of function Fd1 considered here, the average rate of expansion/compression TX of the central part of the image, delimited by the circle C20, is equal to 5.07, i.e., an average expansion by a factor 5 of the central part of the image and consequently a 500% improvement of the definition obtained for a constant number of pixels of the image sensor.

Figure 8:
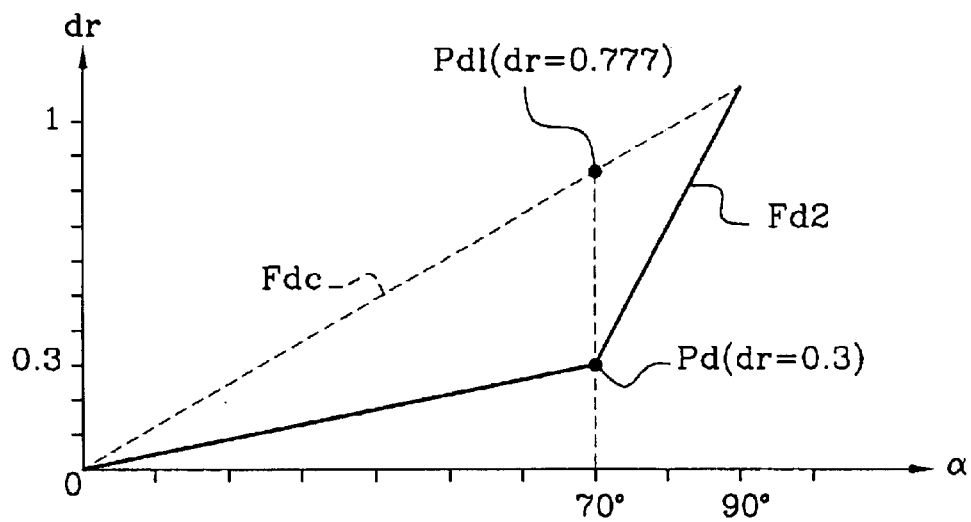
FIG. 8 shows a second example of non-linearity of a panoramic objective lens according to the present invention.

FIG. 8 represents another example of distribution function Fd2 according to the present invention, here having a point of maximum divergence Pd at the angle α=70°, and having a relative distance in relation to the center of the image of 0.3. The maximum divergence of the curve Fd2 is −61.4% here, and the average rate of expansion/compression TX of the central part of the image delimited by the circle C70 (not represented) is 0.5, i.e., an average compression by a factor of 0.15 of the central part of the image. The expanded part of the image here is thus located here on the edge of the image, between the circle C70 and the circle C90, and has an average rate of expansion/compression of 2.3. Thus, an image disk obtained with a panoramic objective lens having a distribution function conforming to the function Fd2, has a high definition zone on its edges, that lend themselves well to digital enlargements, and a low definition zone in its central part.

Figure 9:
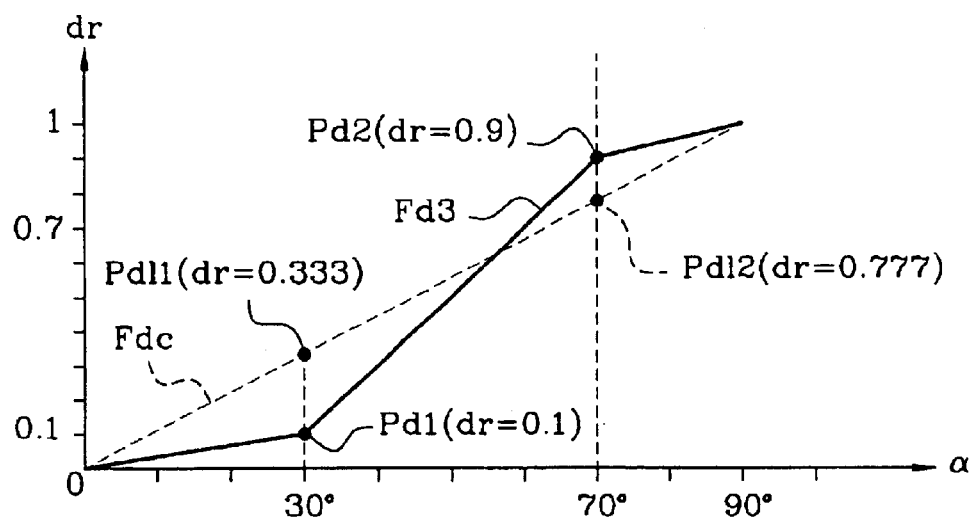
FIG. 9 shows a third example of non-linearity of a panoramic objective lens according to the present invention.

FIG. 9 represents a third example of distribution function Fd3 according to the present invention, having a first point of maximum divergence Pd1 (α=30°, dr=0,1) and a second point of maximum divergence Pd2 (α=70°, dr=0,9). Thus, two maximum divergences can be seen, one negative and equal to−70%, and the other positive and equal to 15.8%. A compressed image zone can also be seen between the center O of the image and the circle C30 passing through the point Pd1, an expanded image zone between the circle C30 and the circle C70 passing through the point Pd2, and a compressed image zone between the circle C70 and the circle C90 forming the edge of the image disk. The average rates of expansion/compression TX(0, C30), TX(C30, C70), TX(C70, C90) for each of these zones are respectively equal to 0.09, 1.6 and 0.48. An image disk obtained with a panoramic objective lens having a distribution function conforming to the function Fd3, has a high definition zone in its intermediate part, which lends itself well to digital enlargements, and two low definition zones in its central part and on its edges.

B—Correction of the Non-linearity of the Initial Image

A first aspect of the present invention was described above, according to which a non-linear distribution of image points onto a digital image was provided to improve the definition of the image in expanded zones, by increasing the number of pixels of the image sensor covered by the expanded zones. Before describing examples of embodiments of non-linear panoramic objective lenses according to the present invention, a second aspect of the present invention will be described which involves correcting the non-linearity of the image disk obtained in order to present the observer with an image free from optical distortion.

Figure 10:
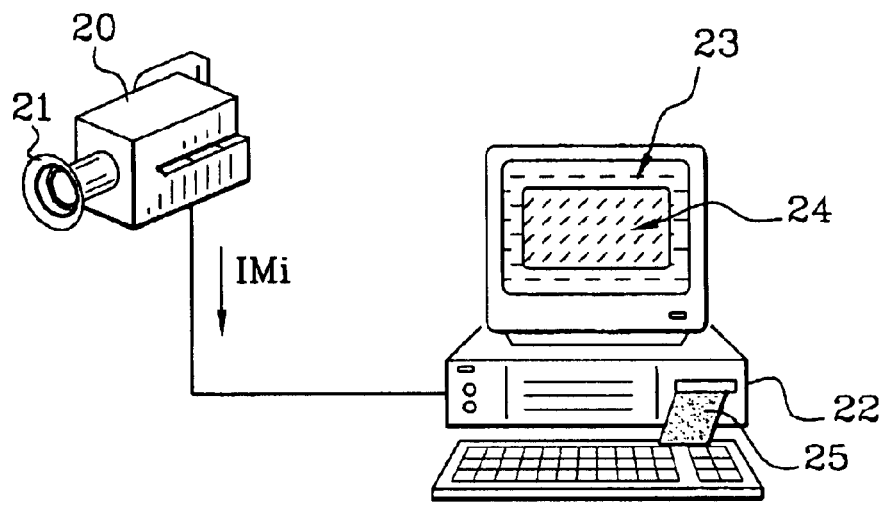
FIG. 10 represents a system for displaying a digital panoramic image by means of which a method for correcting the panoramic image according to the present invention is implemented.

This second aspect of the present invention is implemented at the stage of the processing of the initial image by computer, to present an interactive panoramic image on a screen. The means for implementing the method of the present invention are shown in FIG. 10 and are classical in themselves. A digital camera 20 can be equipped with a non-linear panoramic objective lens 21 and connected to a microcomputer 22 comprising a screen 23. The digital images IMi taken by means of the camera 20 are transferred to the microcomputer to be processed and displayed on the screen 23, in a display window 24. A processing program comprising an algorithm for transforming and displaying the images is first loaded into the microcomputer, by means of a CD-ROM 25 or by downloading via the Internet for example. The camera 20 can be a still digital camera or a digital video camera and the connection to the microcomputer can be permanent or otherwise. In the case of a video camera, the microcomputer receives a flow of images that it processes in real time to display them on the screen.

In this context, the correction method according to the present invention can be performed according to two embodiments. A first embodiment involves correcting the initial image by means of a function $Fd^{-1}$ that is the reciprocal function of the distribution function Fd according to the present invention. As the distribution function Fd is known and determined at the time the non-linear objective lens is designed, it is easy to deduce the reciprocal function $Fd^{-1}$ therefrom. This correction step allows a corrected image to be obtained in which the non-linearity due to the objective lens according to the present invention is removed. The corrected image is equivalent to an image taken by means of a classical panoramic objective lens and can then be processed by any classical display software program available in stores, provided for transferring the image points of an image disk into a three-dimensional space and for interactively displaying a sector of the image obtained.

The second alternative of the method involves using the distribution function Fd in an image display algorithm working backwards, that is defining in real time the color of the pixels of a display window using the image points of the image disk.

First Embodiment of the Correction Method

Figure 11:
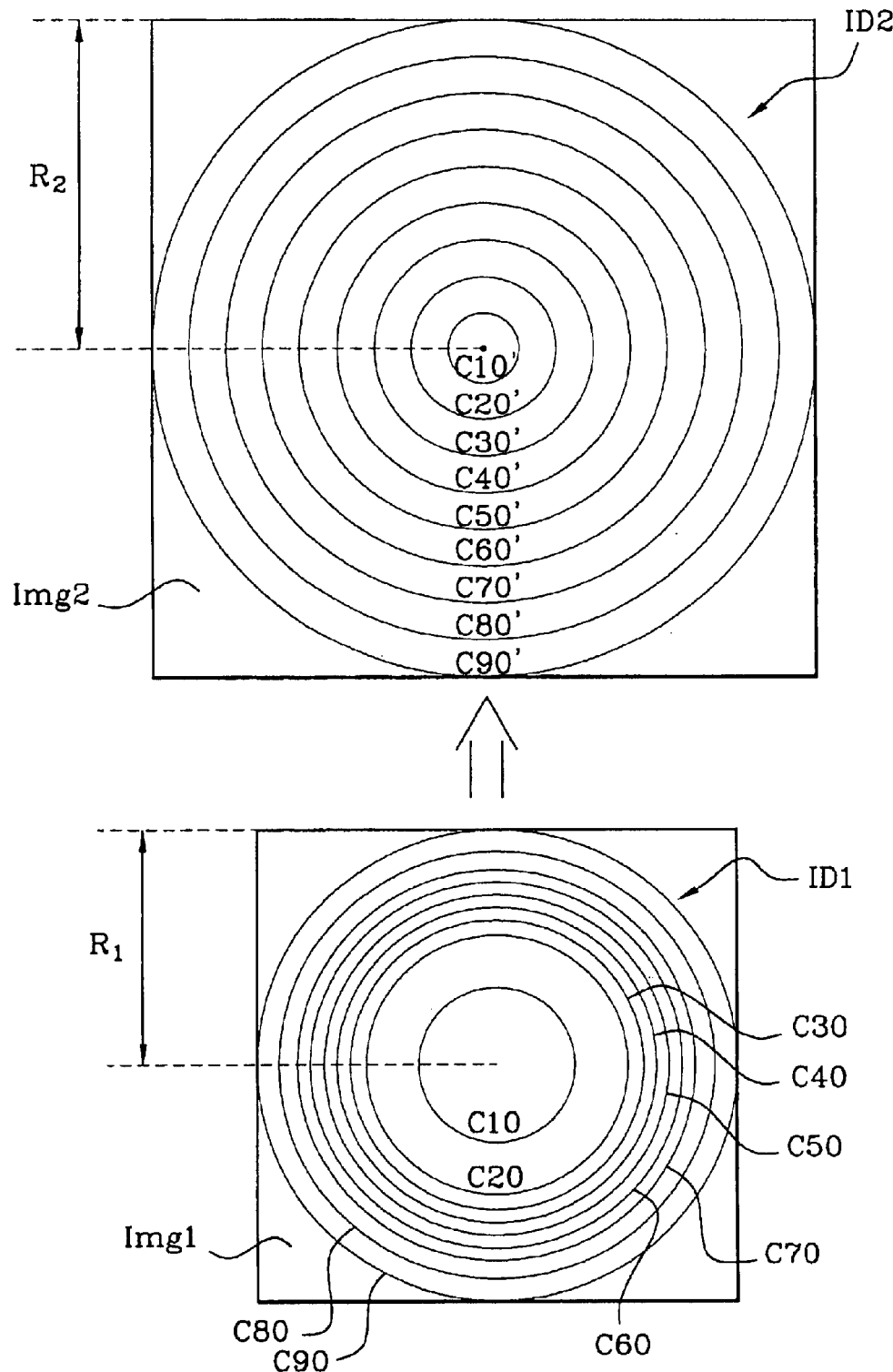
FIG. 11 schematically shows a first embodiment of the correction method according to the present invention.

FIG. 11 shows the first embodiment of the method according to the present invention. Here it is assumed that there is an initial image Img1 comprising a non-linear image disk ID1 of radius R1, having for example an expansion zone in the center (circles C10 and C20). The initial image Img1 is transformed into a corrected image Img2 comprising a linear image disk ID2 of radius R2. The radius R2 of the image disk ID2 is higher than the radius R1 of the initial image disk ID1 and the image disk ID2 has a resolution equal or substantially equal to the resolution offered by the zone of the image disk Img1 in which the greatest density of information (i.e. the zone in which the image is the most expanded) is to be found. Here, the zone with the greatest density of information is the central part of the image delimited by the circle C20.

The main steps of this method are the following:

initially, the size R2 of the linearized image disk ID2 is calculated by means of the reciprocal function Fd$^{-1}$, considering on the initial image disk ID1 the place in which the image is the most expanded, so that the corrected image Img2 has a resolution equal or substantially equal to the resolution offered by the zone of the image Img1 in which the greatest density of information is to be found, then each pixel of the image to be calculated Img2 is scanned, and the position of its twin point on the image Img1 is searched for, and then the color of the corresponding point on the initial image Img1 is allocated to the point of the new image Img2.

This method is implemented by means of an algorithm described below (algorithm 1), in which:

A is the angular aperture of the objective lens,

D is the distance of an image point relative to the center of the initial image disk ID1, R1 is the size in pixels of the radius of the initial image disk ID1 (i.e. the number of pixels between the center and the edge of the image disk), R2 is the size in pixels of the radius of the linearized image disk ID2, I and J are the coordinates of an image point in the image produced, the coordinate point (0,0) being in the center of the image, U and V are the coordinates of a twin point in the original image, the coordinate point (0,0) being in the center of the image, "Current_angle" and "Previous_angle" are iterative parameters, DAM is the minimum angular difference between two object points corresponding to two adjacent image points on the initial image disk ID1 (i.e., the maximum resolution of the image disk ID1 expressed in angular difference), and Fdlin$^{-1}$ is the reciprocal function of a distribution function of a classical linear objective lens, of the type: Fdlin $(\alpha)=K\alpha$, with $K=2/A$, i.e. $K=1/90$ with an objective lens having an angular aperture of 180°.

| Algorithm 1 |
|---|
| [finding DAM]<br>1/ DAM = A/2<br>2/ Current_angle = 0<br>3/ For D = 1 to R1 [with increments of 1]<br>4/    Previous_angle = Current_angle<br>5/    Current_angle = Fd$^{-1}$(D/R1)<br>6/    If DAM > (Current_angle – Previous_angle) then<br>7/        DAM = (Current_angle – Previous_angle)<br>8/    End if<br>9/ End for<br>[determining the radius R2 of the disk ID2]<br>10/ R2 = (A/2)/DAM |

| -continued |
|---|
| Algorithm 1 |
| [calculating the new image]<br>[scanning each pixel of the image to be calculated Img2]<br>11/ For I =–R2 to +R2 [with an increment of 1]<br>12/    For J =–R2 to +R2 [with an increment of 1]<br>[searching for polar coordinates (R',θ) of the twin point on the image Img1 using the coordinates (R,θ) of the point of the image Img2]<br>13/       R = √(I²+J²)<br>14/       If R < R2 then<br>15/          If J < 0 then<br>16/             θ = arc cosine(I/R)<br>17/          If not<br>18/             θ = –arc cosine(I/R)<br>19/          End if<br>[conversion of the radius R to find the radius R']<br>20/      R'= R1*Fd(Fdlin$^{-1}$ (R/R2))<br>as Fdlin$^{-1}$(R) = R/K and K=2/A, it follows that:<br>20'    /R'=R1*Fd((R/R2) * (A/2))<br>[return to the Cartesian coordinates]<br>21/      U = R'*cos(θ)<br>22/      V = R'*sin(θ)<br>[allocation of the color of the point]<br>23/      Img2[I,J] = Img1[U,V]<br>24/    If not<br>[allocation of the color black to the points outside the image disk]<br>25/      Img2[I,J] = Black<br>26/    End if<br>27/  End for<br>28/ End for |

Note that the step 14 avoids calculating all the points situated outside the image disk (the points are outside the image disk when R>R2). Moreover, the algorithm 1 can be improved by subsequently performing a bilinear interpolation on the image Img2, in itself well known by those skilled in the art, so as to smooth out the final image.

FIG. 12 is a flow chart giving a general overview of the steps of a method for capturing and interactively presenting a panoramic image on a screen. This flow chart is described in table 1 in the Appendix, that is an integral part of the description. The steps S1 and S2, respectively the acquisition of the image and the transfer of the image into a computer, are classical in themselves. The step of linearising the image disk S3 is performed in accordance with the method of the present invention, by means of the algorithm described above for example. The step S4, called "digitization", is also classical. This step involves transferring the image points of the corrected image disk Img2 into a three-dimensional space of axes Oxyz in which the image points are for example referenced in spherical coordinates. The step S5 is also classical, and involves displaying a sector of the three-dimensional image called display window on a screen. The display window is moved upwards or downwards depending on the user's actions, or is enlarged at the user's request. When enlarged, the definition is better than in previous practices in the zones corresponding to the expanded parts of the initial image.

Second Embodiment of the Correction Method

Figure 13:
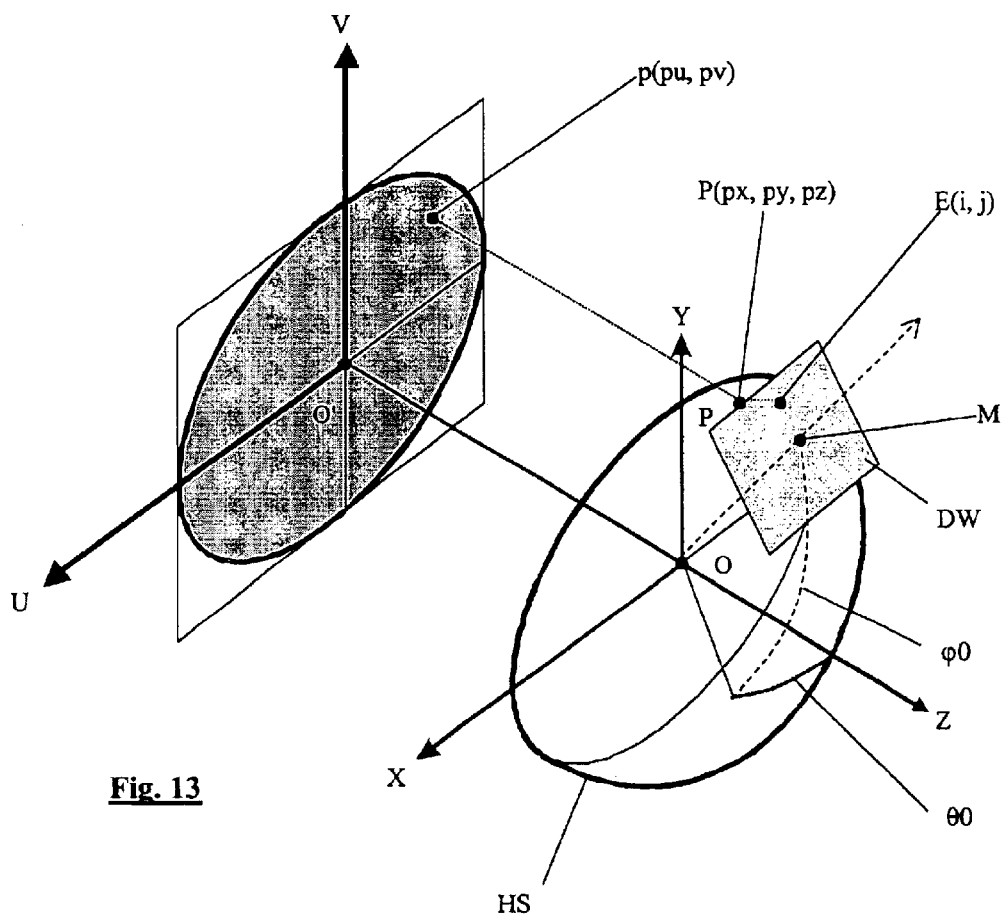
FIG. 13 schematically shows a second embodiment of the correction method according to the present invention.

The second embodiment of the correction method according to the present invention is shown in FIG. 13. Schematically, this method involves projecting the image points of an image sector corresponding to a display window DW onto the image disk ID1 of the initial image Img1. This method does not require calculating a corrected image disk, contrary to the previous embodiment.

The image points of the display window DW are referenced E(i,j) in the coordinate system of the display window, expressed in line coordinates i and in column coordinates j. The points E(i,j) are first projected onto a sphere portion HS of center O and of axes OX, OY, OZ, to obtain image points P(px, py, pz) belonging to the sphere portion. This sphere portion covers a solid angle that corresponds to the aperture of the objective lens used. The example considered until now was of a panoramic objective lens having an aperture of 180° and the sphere portion HS considered here is therefore a hemisphere. The image points P thus determined are then projected onto the image disk Img1 by means of the non-linear distribution function Fd according to the present invention, which first requires calculating the field angle α of the points P in relation to the center O of the hemisphere. The center O of the hemisphere is the virtual equivalent of the center "p" of the panorama, having been used as the reference, in the description above, to determine the angles of incidence a of the object points and the shape of the function Fd. The projection of the image points P onto the image disk ID1 allows image points p(pu, pv) to be obtained on the image disk, in a coordinate system of center O' (corresponding to the center of the image disk) and of axes O'U and O'V. The axis OZ in the system of the hemisphere HS is perpendicular to the plane of the image disk ID1 and passes through the center O' of the image disk, such that the axes O'Z and OZ are merged.

As it will be clear to those skilled in the art, the correction of the non-linearity of the image disk is implicit here since the image points p(pu, pv) corresponding to the image points E(i, j) of the display window DW are "retrieved" from the image disk ID1, by means of the function Fd.

The method according to the present invention is implemented by means of an algorithm described below (algorithm 2), in which:

i and j are the coordinates of a point E(i, j) of the display window,

Imax and Jmax are the number of columns and the number of lines of the display window, corresponding to the dimensions in number of pixels of the display window, Ex, Ey and Ez are the Cartesian coordinates of a point E(i,j) of the display window DW in the coordinate system OXYZ, Px, Py and Pz are the Cartesian coordinates of a point P on the hemisphere HS, pu and pv are the Cartesian coordinates of an image point p of the image disk in the coordinate system O'UV, L is the size of the image disk, in number of pixels, M is the center of the display window DW, the "viewing direction" is the direction materialised by the point O and the center of the display window M, the display window forming the base of a pyramid of vision of the observer the top of which is the point O (observer's position), θ0 and φ0 are the longitudes and latitudes corresponding to the viewing direction from the point O towards the center M of the display window, Screen_Pixel[i,j] is the color (RGBA) of a point E (i,j) of the display window DW, Image_Pixel[i,j] is the color of the point P(i,j) of the hemisphere HS corresponding to the image disk, the coordinate point (0,0) being situated in the center of the image disk, R is the radius of the hemisphere HS (arbitrary value chosen so as to improve the accuracy of the calculations, R is for example chosen to be equal to 10,000), α is the angle in relation to the center O of an image point "P situated on the hemisphere (represents the field angle at the moment the shot of the corresponding object point is taken), aux1, aux2 are intermediate variables, "Zoom" is a variable defining the enlargement, having a default value equal to R, and "√" is the square root function.

---

Algorithm 2

1/ For i=−Imax/2 to i=Imax/2 do [by increments of 1]
2/    For j=−Jmax/2 to j=Jmax/2 do [by increments of 1]
[calculation of the Cartesian coordinates Ex, Ey, Ez of the point E of the display window in the system OXYZ]
3/      Ey = j*cos(φ0) − Zoom*sin(φ0)
4/      Ez = Zoom*cos(φ0) + j*sin(φ0)
5/      aux1 = Ez
6/      Ez = Ez*cos(θ0) − i*sin(θ0)
7/      Ex = i*cos(θ0) + aux1*sin(θ0)
[calculation of the coordinates of the point P corresponding to the point E]
8/      aux2 = R/√(Ex*Ex + Ey*Ey + Ez*Ez)
9/      Px = Ex*aux2
10/     Py = Ey*aux2
11/     Pz = Ez*aux2
[calculation of the coordinates of the point p corresponding to the point P, in the coordinate system (O'UV), by means of the function Fd]
12/     X = Px/R
13/     Y = Py/R
14/     r = √(X*X + Y*Y)
15/     α = arcsine(r)
16/     U = X/r
17/     V = Y/r
18/     pu = L*U*Fd(α)
19/     pv = L*V*Fd(α)
20/     Screen_Pixel[i,j] = Image_Pixel[pu,pv]
21/   end for
22/ end for

---

A request for enlargement (zoom) by the user results in the algorithm modifying the "Zoom" parameter. When the "Zoom" parameter is equal to the radius R of the hemisphere, the display window DW is tangential to the hemisphere (FIG. 13). When the parameter "Zoom" is higher than R, the window DW moves away from the hemisphere (along the axis given by the viewing position OM), which corresponds to a shrinking of the pyramid of vision and an enlargement of the image sector presented in the window DW. The enlargement of the image sector presented to the observer is therefore equal to the ratio of the "Zoom" parameter by the radius R.

When the steps 18 and 19 have been performed with a "Zoom" parameter higher than R, a gain in definition is obtained in the zones in which the image has been expanded at the time the shot is taken as there are still. While the resolution limit is not reached, two adjacent pixels on the image disk which correspond to two adjacent pixels of the display window. In the compressed zones of the image, the search for the closest pixel by means of the relations L*U*Fd(α) and L*V*Fd(α) results, on the other hand, in the algorithm finding the same image pixel for several adjacent pixels of the display window on the image disk. However, these compressed image zones, benefiting from a lesser definition on the image disk, are considered secondary for the intended application, in accordance with the premise on which the present invention is based.

Generally speaking, any other projection method can be used, the essential step according to the present invention being that of finding the field angle a of the object points on the hemisphere, in relation to the center of the hemisphere, so as to use the distribution function Fd in the calculations.

It will be understood that the algorithm 2 is applicable when there are two complementary image disks, one corresponding to a front photograph and the other to a rear photograph of a panorama at 360°, the second photograph being taken by rotating the panoramic objective lens by 180° around an axis passing through the center of the panorama. In this case, two hemispheres and two image points called "Front_Image_Pixel" and "Rear_Image_Pixel" are defined:

Front_Image_Pixel[i,j]: color of a point E(i,j) on the hemisphere corresponding to the front photo, the coordinate point (0,0), being situated in the center of the image disk, Rear_Image_Pixel[i,j]: color of a point E(i,j) on the hemisphere corresponding to the rear photo, the coordinate point (0,0) being situated in the center of the image disk.

The steps 18 and following of the algorithm 2 are therefore modified as follows:

```
18/   pu = L*U*Fd(α)
19/   pv = L*V*Fd(α)
20/   If Pz >= 0 then
21/     Screen_Pixel[i,j] = Front_Image_Pixel[pu,pv]
22/     If not Screen_Pixel[i,j] = Rear_Image_Pixel[L-pu,pv]
23/   End if
24/   end for
25/   end for
```

Figure 14:
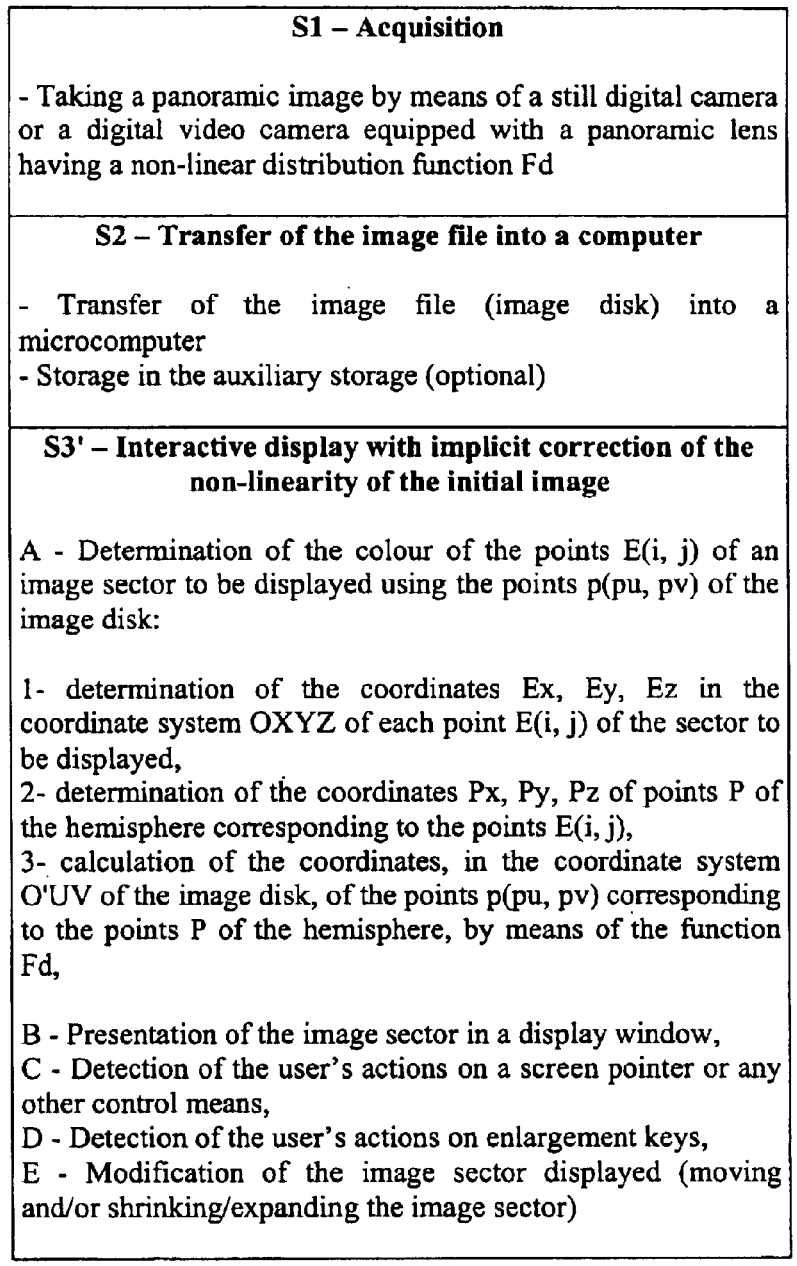
FIG. 14 is a flow chart describing a method for displaying a panoramic image incorporating the second correction method according to the present invention.

FIG. 14 is a flow chart giving a general overview of the steps of a method for capturing and interactively presenting a panoramic image on a screen. This flow chart is described in table 2 in the Appendix, that is an integral part of the description. The acquisition S1 and transfer S2 steps described above are again included. The step S2 is followed by an interactive display step S3' performed in accordance with the method that has just been described, implicitly incorporating a correction of the non-linearity of the image disk through the use of the distribution function Fd to find the points corresponding to the pixels of the display window on the image disk.

II—EXAMPLES OF EMBODIMENTS OF A NON-LINEAR PANORAMIC OBJECTIVE LENS ACCORDING TO THE PRESENT INVENTION

Here, one object of the present invention is to provide a panoramic objective lens having a non-linear distribution function Fd, that is simple in structure and with a low cost price. Below, two examples of embodiments of non-linear panoramic objective lenses according to the present invention will be described, the first being a direct-type objective lens and the second of indirect type, that is using mirrors.

First Embodiment

Apodizers are optical systems well known by those skilled in the art, used to change the energy distribution (amount of light) of a source of light at the pupil. They are particularly used to level out the energy in a laser beam or even, in the field of photography, to limit the diffraction of light through the lenses. Using an apodizer as a filter is also well known, to cover the aperture of an optical instrument in order to remove the secondary rings of a diffraction pattern. When it is desirable to separate the images of two neighbouring pin-point sources, these secondary rings are a nuisance and reduce the resolution. "Apodization" can thus be performed, that is these secondary rings can be removed by placing an adequate filter in the plane of the pupil.

Here, the idea of the present invention is to use an apodizer for a different purpose: the principle of the apodizer is used to control the angular distribution of a panoramic objective lens and to obtain the non-linearity sought.

Figure 15:
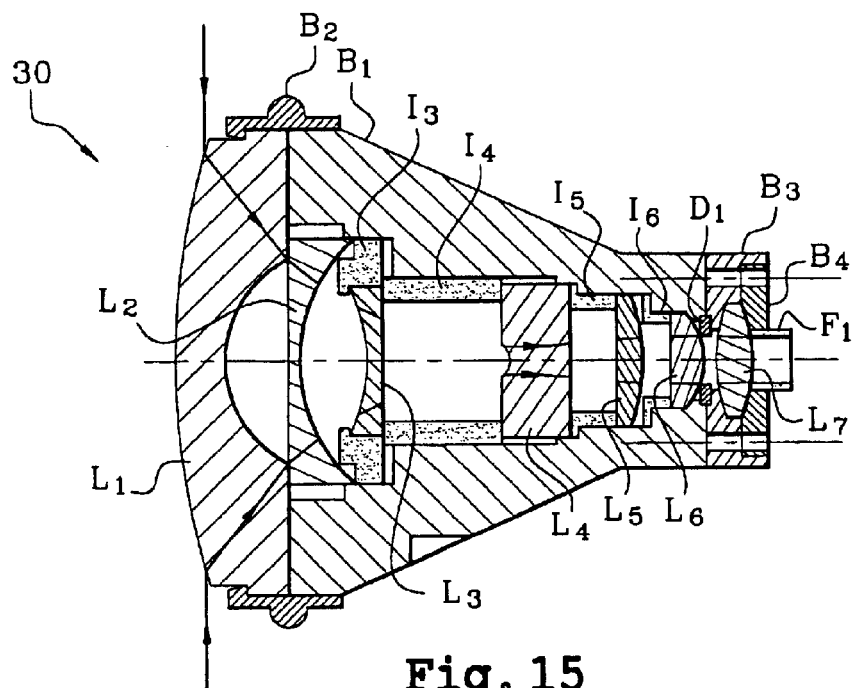
FIG. 15 is a cross-section of a first embodiment of a non-linear panoramic objective lens according to the present invention.

FIG. 15 represents, by a cross-section, an example of an embodiment of a non-linear objective lens 30 according to the present invention. The distribution function Fd obtained by means of the objective lens 30 is the function Fd1 described above in relation with FIG. 7B, the objective lens 30 thus expanding the image in the center.

Figure 16:
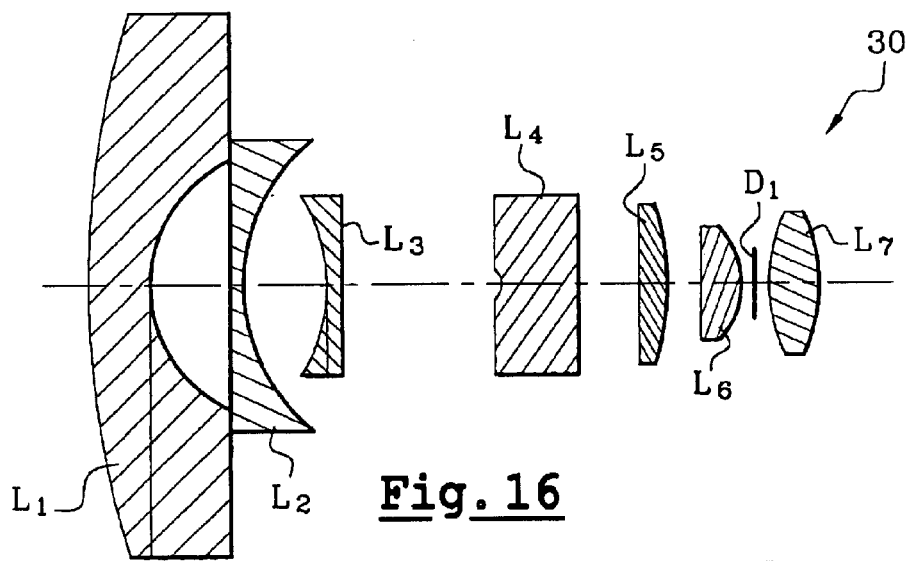
FIG. 16 is an exploded cross-section of a system of lenses present in the panoramic objective lens in FIG. 15.

The objective lens 30 comprises a system of lenses that is also represented in FIG. 16 by an exploded view. A divergent optical group formed by lenses L1, L2, L3, and a convergent optical group formed by lenses L4, L5, L6, L7 can be distinguished. A diaphragm D1 is arranged between the lenses L6 and L7.

Parts B1 to B4 and parts I3 to I6 are provided to hold the lenses. The part B1 forms the body of the objective lens and comprises a cylindrical cavity in which the lenses L2 to L6 are arranged. The part B2 is screwed onto the body B1 and allows the front lens L1 to be fastened against the front of the part B1, the back of the lens L1 being in contact with the front of the lens L2. The parts B3 and B4 are fastened with screws (not represented) against the rear part of the body B1. The part B3 holds the diaphragm D1 and comprises a cavity for receiving the back lens L7. The part B4 presses the lens L7 into the part B3 and comprises a rear sleeve F1 equipped with a thread allowing an image sensor to be fastened, such as a CCD sensor for example. The parts I3 to I6 are dividers allowing the distances between the lenses L2 to L6 inside the body B1 to be adjusted with precision.

The divergent optical group L1, L2, L3 defines the field angle of the objective lens 30, here of 180°. The front lens L1 is a divergent meniscus in PMMA with an aspherical front and a concave back. It must be said that PMMA or polymethacrylate is organic glass with a low cost price, belonging to the category of plastics. The lens L2 is of the planoconcave type and is made of borosilicate BK7 (standard optical mineral glass). Its front (plane side) is pressed against a flat part of the back of the lens L1, which extends at the periphery of the concave part (useful part) of the back of the lens L1. The lens L3 is also of the planoconcave type and is in BK7. Its concave side is oriented towards the front, opposite the back of the lens L2.

The convergent optical group L4, L5, L6, L7 forms an apodizer within the meaning of the present invention and determines the non-linear distribution function Fd, which is obtained here by means of a-spherical lenses and a diffractive lens.

Figure 17:
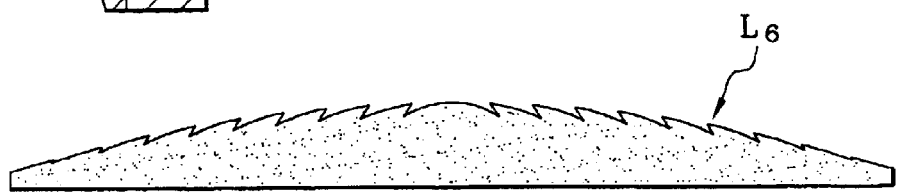
FIG. 17 is a side view of a lens present in the panoramic objective lens in FIG. 15.

The lens L4 is of the planoconcave type and is in PMMA. Its concave front is a-spherical. The lens L5 is of the planoconvex type and is in BK7, its plane side being oriented towards the front. The lens L6 is a meniscus in PMMA having a concave and aspherical front and a diffractive convex back. This diffractive back has a diffraction grating made up of circular diffractive zones centered on the optical axis of the lens, the profile of which is represented in FIG. 17. Finally, the back lens L7 is of the biconvex type and is in BK7. The back lens L7 focuses the luminous flux onto the image plane, at the spot provided for the image sensor.

The aspherical fronts of the lenses L1, L4 and L6 are determined by means of a formula of the type:

$$z(r)=[(C*r^2)/(1+\sqrt{1-(1+k)*C^2*r^2})]+A_1r^2+A_2r^6+A^4r^8+A_5r^{10}$$

in which:

"k" is a conicity constant,

"A1", "A2", "A3", "A4", "A5" are constants for adjusting the coefficient of conicity according to the position, "z" is the shape of the surface, "r" is the radius at the center, and "C" is the radius of curvature.

The diffractive back of the lens L6 allows the number of lenses required to produce the objective lens 30 to be reduced. In the present embodiment, it avoids for example providing at least three supplementary complex lenses. It is determined by means of a formula of the type:

$$\phi(r)=\alpha 1(r/R0)^2+\alpha 2(r/R0)^4$$

in which:

"r" is the distance in relation to the center of the lens of a point considered, located on the surface of the lens, $\alpha 1$ and $\alpha 2$ are constants defining the phase shift of the wave surface, "R0" is a constant allowing r to be normalized, and "$\phi$" is the phase shift introduced by the diffractive surface at the point considered.

The lenses in PMMA L1, L4 and L6 are manufactured using a method called "diamond turning" well known by those skilled in the art, which involves milling the surface of the lenses along a mesh of points.

The solid angle of propagation of the light rays in each lens is marked on FIG. 15 by black lines. The light rays pass through the optical group L1, L2, L3, pass through the apodizer L4, L5, L6, L7 while being stopped down by D1.

The determination of the parameters defining the aspherical sides mentioned above, the formula of the diffraction grating of the lens L6, the calculation of the diameters of the lenses and of the distances between the lenses, are within the understanding of those skilled in the art using the classical computer-aided lens design tools.

Second Embodiment

Figure 18:
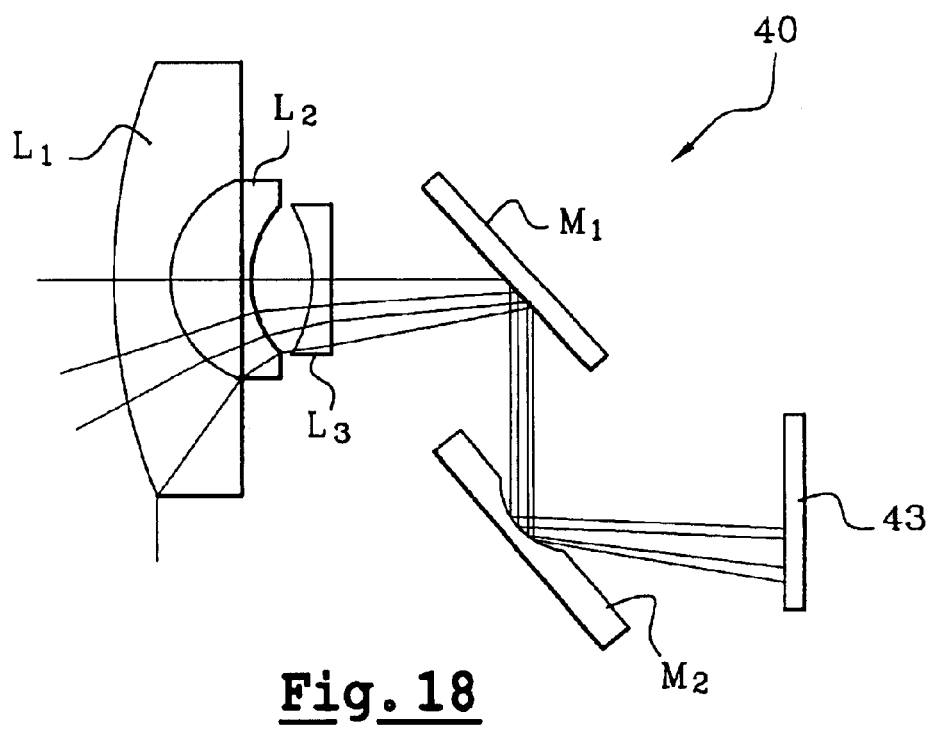
FIG. 18 is the diagram of a second embodiment of a non-linear panoramic objective lens according to the present invention.

FIG. 18 schematically represents a non-linear objective lens 40 using a distorting mirror. The objective lens 40 comprises, at input, a divergent optical group consisting, for example, of the three lenses L1, L2, L3 described above, defining the field angle of the objective lens. Opposite the optical group a plane mirror M1 is located which reflects the luminous beam onto a distorting mirror M2 of aspherical concave shape. The beam reflected by the mirror M2 is sent onto an image sensor 43.

In this embodiment, the irregularities of sphericity that the concave part of the mirror has determined the angular distribution function Fd sought for the intended application (distortion in the center, on the edges . . . ). The result obtained is equivalent to that of the optical system described above. Obtaining the distribution function Fd is within the understanding of those skilled in the art using computer-aided lens design tools which allow, in addition to designing lenses, reflecting surfaces to be designed and focused.

One alternative of this embodiment involves providing several distorting mirrors so as to combine distortions or simplify complex distortions by characterising a type of distortion per mirror, which has the advantage of facilitating the engineering work.

Yet another alternative involves using one or more deformable mirrors to produce a so-called "adaptive" optical system. Deformable mirrors comprise a layer of piezoelectric micro-pistons covered by a reflecting layer. Each piezoelectric piston is activated individually, so that the distortions of the mirror can be controlled at several points to obtain the desired shape. This device can be driven by an integrated circuit comprising several configurations of the micro-pistons in its memory, to obtain a distribution function Fd that is adjustable according to the intended use, which avoids providing several objective lenses.

Generally speaking, adaptive optics are in themselves known by those skilled in the art and used in high-precision telescopes to correct the optical defects of the lenses or atmospheric distortions. Deformable mirrors also exist in the field of optical disks, if reference is made for example to the U.S. Pat. Nos. 5,880,896 and 5,745,278.

Therefore, means that are in themselves known are also used for different purposes, not to correct a lens but to obtain, on the contrary, a non-linear angular distribution function.

It will be understood that various other alternatives of the present invention may be made. In particular, although the description above was of non-linear panoramic objective lenses with axial symmetry relative to the optical axis, in which the position of an image point only varies with the field angle relative to this axis of the corresponding object point (which gives a distribution of points in concentric circles, as seen above), the framework of the present invention also covers providing objective lenses the non-linearity of which is not symmetrical relative to the optical axis, such that the expanded parts of the image may, in this case, not be set on the center of the image.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX (Forming an Integral Part of the Description)

TABLE 1

S1 - Acquisition

Taking a panoramic image by means of a still digital camera or a digital video camera equipped with a panoramic objective lens having a non-linear distribution function Fd S2 - Transfer of the image file into a computer Transfer of the image file (image disk) into a microcomputer
Storage in the auxiliary storage (optional)

S3 - Linearisation of the image disk

Transfer of the image points of the initial image disk into a second virtual image disk comprising more image points than the initial image disk, by means of the function $Fd^{-1}$
⇒ Obtaining a linear image disk S4 - Digitization Transfer of the image points of the second image disk into a system of axes OXYZ in spherical coordinates ⇒ Obtaining a panoramic image in a hemisphere S5 - Interactive display Determination of the image points of an image sector to be displayed
Display of the image sector on a display window
Detection of the user's actions on a screen pointer or any other control means,
Detection of the user's actions on keys for image enlargement,
Modification of the sector displayed (sliding the image sector displayed on the surface of the hemisphere and/or shrinking/expanding the image sector displayed)

TABLE 2

S1 - Acquisition

Taking a panoramic image by means of a still digital camera or a digital video camera equipped with a panoramic objective lens having a non-linear distribution function Fd S2 - Transfer of the image file into a computer Transfer of the image file (image disk) into a microcomputer
Storage in the auxiliary storage (optional)

S3' - Interactive display with implicit correction of the non-linearity of the initial image A - Determination of the color of the points E(i, j) of an image sector to be displayed using the points p(pu, pv) of the image disk:
1 - determination of the coordinates Ex, Ey, Ez in the coordinate system OXYZ of each point E(i, j) of the sector to be displayed,
2 - determination of the coordinates Px, Py, Pz of points P of the hemisphere corresponding to the points E(i, j),
3 - calculation of the coordinates, in the coordinate system O'UV of the image disk, of points p(pu, pv) corresponding to the points P of the hemisphere, by means of the function Fd,
B - Presentation of the image sector in a display window,
C - Detection of the user's actions on a screen pointer or any other control means,
D - Detection of the user's actions on enlargement keys,
E - Modification of the image sector displayed (moving and/or shrinking/expanding the image sector)

We claim:

1. A method for capturing a digital panoramic image, by projecting a panorama onto an image sensor by means of a panoramic objective lens, the panoramic objective lens having an image point distribution function that is not linear relative to the field angle of object points of the panorama, the distribution function having a maximum divergence of at least ±10% compared to a linear distribution function, such that the panoramic image obtained has at least one substantially expanded zone and at least one substantially compressed zone.

2. The method according to claim 1, wherein the objective lens has a non-linear distribution function that is symmetrical relative to the optical axis of the objective lens, the position of an image point relative to the center of the image varying according to the field angle of the corresponding object point.

3. The method according to claim 1, wherein the objective lens expands the center of the image and compresses the edges of the image.

4. The method according to claim 1, wherein the objective lens expands the edges of the image and compresses the center of the image.

5. The method according to claim 1, wherein the objective lens compresses the center of the image and the edges of the image and expands an intermediate zone of the image located between the center and the edges of the image.

6. The method according to claim 1, wherein the objective lens comprises a set of lenses forming an apodizer.

7. The method according to claim 6, wherein the set of lenses forming an apodizer comprises at least one aspherical lens.

8. The method according to claim 6, wherein the set of lenses forming an apodizer comprises at least one diffractive lens.

9. The method according to claim 1, wherein the objective lens comprises a set of mirrors including at least one distorting mirror.

10. A method for displaying an initial panoramic image obtained in accordance with the method according to claim 1, the method for displaying comprising:

correcting the non-linearity of the initial image, performed by means of a reciprocal function of the non-linear distribution function of the objective lens or by means of the non-linear distribution function.

11. The method according to claim 10, wherein the step of correcting comprises a step of transforming the initial image into a corrected digital image comprising a number of image points higher than the number of pixels that the image sensor comprises.

12. The method according to claim 11, further comprising:

calculating the size of the corrected image, by means of the reciprocal function of the distribution function, so that the resolution of the corrected image is equivalent to the most expanded zone of the initial image, and scanning each image point of the corrected image, searching for the position of a twin point of the image point on the initial image and allocating the color of the twin point to the image point of the corrected image.

13. The method according to claim 11, wherein the initial image and the corrected image comprise an image disk.

14. The method according to claim 11, further comprising:

transferring the image points of the corrected image into a three-dimensional space, and presenting one sector of the three-dimensional image obtained on a display means.

15. The method according to claim 10, further comprising:

determining the color of image points of a display window, by projecting the image points of the display window onto the initial image by means of the non-linear distribution function, and allocating to each image point of the display window the color of an image point that is the closest on the initial image.

16. The method according to claim 15, wherein the projection of the image points of the display window onto the initial image comprises:

projecting the image points of the display window onto a sphere or a sphere portion, determining the angle in relation to the center of the sphere or the sphere portion of each projected image point, and projecting onto the initial image each image point projected onto the sphere or the sphere portion, the projection being performed by means of the non-linear distribution function considering the field angle that each point to be projected has in relation to the center of the sphere or the sphere portion.

17. A panoramic objective lens comprising:

optical means for projecting a panorama into an image plane of the objective lens, the optical means having an image point distribution function that is not linear relative to the field angle of object points of the panorama, the distribution function having a maximum divergence of at least ±10% compared to a linear distribution function, such that a panoramic image obtained by means of the objective lens comprises at least one substantially expanded zone and at least one substantially compressed zone.

18. The panoramic objective lens according to claim 17, having a non-linear distribution function that is symmetrical relative to the optical axis of the objective lens, the position of an image point relative to the center of an image obtained varying according to the field angle of the corresponding object point.

19. The panoramic objective lens according to claim 17, wherein the lens expands the center of an image and compresses the edges of the image.

20. The panoramic objective lens according to claim 17, wherein the lens expands the edges of an image and compresses the center of the image.

21. The panoramic objective lens according to claim 17, wherein the lens compresses the center of the image and the edges of the image, and expands an intermediate zone of the image located between the center and the edges of the image.

22. The panoramic objective lens according to claim 17, further comprising a set of lenses forming an apodizer.

23. The panoramic objective lens according to claim 22, wherein the set of lenses forming an apodizer comprises at least one aspherical lens.

24. The panoramic objective lens according to claim 22, wherein the set of lenses forming an apodizer comprises at least one diffractive lens.

25. The panoramic objective lens according to claim 22, comprising polymethacrylate lenses.

26. The panoramic objective lens according to claim 17, comprising a set of mirrors comprising at least one distorting mirror.

* * * * *

UNITED STATES PATENT AND TRADEMARK OFFICE
CERTIFICATE OF CORRECTION

PATENT NO.    : 6,844,990 B2
DATED         : January 18, 2005
INVENTOR(S)   : Jean-Claude Artonne et al.

It is certified that error appears in the above-identified patent and that said Letters Patent is hereby corrected as shown below:

Column 2,
Line 34, "ax" should be replaced with -- α --;

Column 13,
Line 17, "a" should be replaced with -- α --;

Column 14,
Line 65, "a" should be replaced with -- α --;

Column 16,
Line 62, the formula should read:

-- $z(r) = [(C^*r^2)/(1 + \sqrt{(1-(1+k)^*C^{2*}r^2)}] + A_1r^2 + A_2r^4 + A_3r^6 + A_4r^8 + A_5r^{10}$ --.

Signed and Sealed this

Twenty-fourth Day of May, 2005

JON W. DUDAS
*Director of the United States Patent and Trademark Office*

(12) EX PARTE REEXAMINATION CERTIFICATE (10588th)
United States Patent
Artonne et al.

(10) Number: US 6,844,990 C1
(45) Certificate Issued: May 8, 2015

(54) METHOD FOR CAPTURING AND DISPLAYING A VARIABLE RESOLUTION DIGITAL PANORAMIC IMAGE

(75) Inventors: Jean-Claude Artonne, Montreal (CA); Christophe Moustier, Marseilles (FR); Benjamin Blanc, Montreal (CA)

(73) Assignee: 6115187 CANADA, INC., Saint Laurent, Quebec (CA)

Reexamination Request:
No. 90/013,410, Nov. 26, 2014

Reexamination Certificate for:
Patent No.: 6,844,990
Issued: Jan. 18, 2005
Appl. No.: 10/706,513
Filed: Nov. 12, 2003

Certificate of Correction issued May 24, 2005

Related U.S. Application Data

(63) Continuation of application No. PCT/FR02/01588, filed on May 10, 2002.

(30) Foreign Application Priority Data

May 11, 2001 (FR) ...................................... 01 06261

(51) Int. Cl.
*G02B 13/06* (2006.01)
*H04N 5/225* (2006.01)

(52) U.S. Cl.
CPC .............. *H04N 5/2254* (2013.01); *G02B 13/06* (2013.01)

(58) Field of Classification Search
None
See application file for complete search history.

(56) References Cited

To view the complete listing of prior art documents cited during the proceeding for Reexamination Control Number 90/013,410, please refer to the USPTO's public Patent Application Information Retrieval (PAIR) system under the Display References tab.

*Primary Examiner* — Christina Y Leung

(57) ABSTRACT

A method for capturing a digital panoramic image includes projecting a panorama onto an image sensor by means of a panoramic objective lens. The panoramic objective lens has a distribution function of the image points that is not linear relative to the field angle of the object points of the panorama, such that at least one zone of the image obtained is expanded while at least another zone of the image is compressed. When a panoramic image obtained is then displayed, correcting the non-linearity of the initial image is required and is performed by means of a reciprocal function of the non-linear distribution function of the objective lens or by means of the non-linear distribution function.

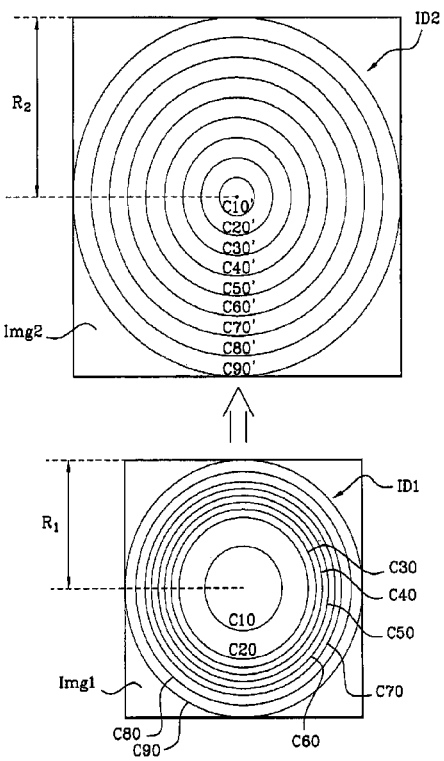

US 6,844,990 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 7, 17-20, 22, 23 and 25 are cancelled.

Claims 2-4, 10 and 15 are determined to be patentable as amended.

Claims 11 and 16, dependent on an amended claim, are determined to be patentable.

New claims 27-47 are added and determined to be patentable.

Claims 5, 8, 9, 12-14, 21, 24 and 26 were not reexamined.

2. The method according to claim [1] *27*, wherein the objective lens has a non-linear distribution function that is symmetrical relative to the optical axis of the objective lens, the position of an image point relative to the center of the image varying according to the field angle of the corresponding object point.

3. The method according to claim [1] *27*, wherein the objective lens expands the center of the image and compresses the edges of the image.

4. The method according to claim [1] *27*, wherein the objective lens expands the edges of the image and compresses the center of the image.

10. A method for displaying an initial panoramic image obtained in accordance with the method according to claim 1, the method for displaying comprising:
  correcting the non-linearity of the initial image, performed by means of a reciprocal function of the non-linear distribution function of the objective lens [or by means of the non-linear distribution function].

15. The method according to claim [10] *27*, further comprising:
  determining the color of image points of a display window, by projecting the image points of the display window onto the initial image by means of the non-linear distribution function, and
  allocating to each image point of the display window the color of an image point that is the closest on the initial image.

*27. A method for displaying a digital panoramic image, the method comprising:*
  *obtaining a digital panoramic image by projecting a panorama onto an image sensor using a panoramic objective lens, the panoramic objective lens having an image point distribution function that is not linear relative to a field angle of object points of the panorama, the distribution function having a maximum divergence of at least +/−10% compared to a linear distribution function, such that the panoramic image obtained has at least one substantially expanded zone and at least one substantially compressed zone; and*
  *displaying the obtained panoramic image by correcting the non-linearity of the initial image, performed by retrieving image points on the obtained image in a coordinate system of center O' using at least the non-linear distribution function and a size L of the obtained image.*

*28. The method according to claim 27, wherein the objective lens compresses the center of the image and the edges of the image and expands an intermediate zone of the image located between the center and the edges of the image.*

*29. The method according to claim 27, wherein the objective lens comprises a set of lenses forming an apodizer.*

*30. The method according to claim 29, wherein the set of lenses forming an apodizer comprises at least one aspherical lens.*

*31. The method according to claim 27, wherein the step of correcting comprises a step of transforming the initial image into a corrected digital image comprising a number of image points higher than the number of pixels that the image sensor comprises.*

*32. A panoramic objective lens comprising:*
  *a set of lenses configured to project a panorama into an image plane of the objective lens, the panoramic objective lens having an image point distribution function that is not linear relative to a field angle of object points of the panorama, the distribution function having a maximum divergence of at least +/−10% compared to a linear distribution function, such that a panoramic image obtained using the objective lens comprises at least one substantially expanded zone and at least one substantially compressed zone,*
  *wherein the panoramic image obtained by the objective lens is configured to be corrected by retrieving image points on the obtained image in a coordinate system of center O' using at least the non-linear distribution function, and a size L of the obtained image.*

*33. The lens according to claim 32, wherein the objective lens has a non-linear distribution function that is symmetrical relative to the optical axis of the objective lens, the position of an image point relative to the center of the image varying according to the field angle of the corresponding object point.*

*34. The lens according to claim 32, wherein the objective lens expands the center of the image and compresses the edges of the image.*

*35. The lens according to claim 32, wherein the objective lens expands the edges of the image and compresses the center of the image.*

*36. The lens according to claim 32, wherein the objective lens compresses the center of the image and the edges of the image and expands an intermediate zone of the image located between the center and the edges of the image.*

*37. The lens according to claim 32, wherein the set of lenses comprises at least one aspherical lens.*

*38. A method for capturing a digital panoramic image, by projecting a panorama onto an image sensor using a panoramic objective lens, the panoramic objective lens having an image point distribution function that is not linear relative to the field angle of object points of the panorama, the distribution function having a maximum divergence of at least 10% compared to a linear distribution function, such that the panoramic image obtained has at least one substantially expanded zone and at least two substantially compressed zones.*

*39. The method according to claim 38, wherein the objective lens has a non-linear distribution function that is symmetrical relative to the optical axis of the objective lens, the position of an image point relative to the center of the image varying according to the field angle of the corresponding object point.*

40. A method for displaying an initial panoramic image obtained in accordance with the method according to claim 38, the method for displaying comprising:
  correcting the non-linearity of the initial image, performed using a reciprocal function of the non-linear distribution function of the objective lens or using the non-linear distribution function.

41. The method according to claim 40, wherein the step of correcting comprises a step of transforming the initial image into a corrected digital image comprising a number of image points higher than the number of pixels that the image sensor comprises.

42. The method according to claim 41, further comprising:
  calculating the size of the corrected image, using the reciprocal function of the distribution function, so that the resolution of the corrected image is equivalent to the most expanded zone of the initial image, and
  scanning each image point of the corrected image, searching for the position of a twin point of the image point on the initial image and allocating the color of the twin point to the image point of the corrected image.

43. The method according to claim 41, wherein the initial image and the corrected image comprise an image disk.

44. The method according to claim 41, further comprising:
  transferring the image points of the corrected image into a three-dimensional space, and
  presenting one sector of the three-dimensional image obtained on a display.

45. The method according to claim 40, further comprising:
  determining the color of image points of a display window, by projecting the image points of the display window onto the initial image using the non-linear distribution function, and
  allocating to each image point of the display window the color of an image point that is the closest on the initial image.

46. The method according to claim 45, wherein the projection of the image points of the display window onto the initial image comprises:
  projecting the image points of the display window onto a sphere or a sphere portion,
  determining the angle in relation to the center of the sphere or the sphere portion of each projected image point, and
  projecting onto the initial image each image point projected onto the sphere or the sphere portion, the projection being performed using the non-linear distribution function considering the field angle that each point to be projected has in relation to the center of the sphere or the sphere portion.

47. The method according to claim 38, wherein the objective lens compresses at least one zone near the center and at least one zone near the edge, and expands at least one intermediate zone of the image between the center and the edge of the image.

* * * * *